United States Patent [19]
Crawford et al.

[11] Patent Number: 5,937,709
[45] Date of Patent: Aug. 17, 1999

[54] SHAFT ALIGNMENT APPARATUS AND METHOD

[75] Inventors: Paul Alexander Crawford; Douglas Frederick Edwards, both of Medina, Ohio

[73] Assignee: MTD Products Inc, Cleveland, Ohio

[21] Appl. No.: 08/992,393

[22] Filed: Dec. 17, 1997

[51] Int. Cl.$^6$ .................................................. F16H 57/02
[52] U.S. Cl. .......................... 74/606 R; 74/607; 29/464; 29/469
[58] Field of Search ................................. 74/606 R, 607; 29/464, 469

[56]  References Cited

U.S. PATENT DOCUMENTS

| | | | |
|---|---|---|---|
| 1,048,328 | 12/1912 | Maize | 74/606 R X |
| 2,912,882 | 11/1959 | Wilson | 74/606 R X |
| 3,348,430 | 10/1967 | Polzin | 74/606 |
| 4,903,546 | 2/1990 | Quintille | 74/606 |
| 5,142,940 | 9/1992 | Hasegawa | 74/606 |
| 5,156,576 | 10/1992 | Johnson | 74/606 R X |
| 5,211,077 | 5/1993 | Louis et al. | 174/606 |
| 5,289,738 | 3/1994 | Szulczewski | 74/606 |
| 5,392,670 | 2/1995 | Hauser | 74/606 |
| 5,473,964 | 12/1995 | Okada et al. | 74/606 |
| 5,501,117 | 3/1996 | Mensing et al. | 74/420 |
| 5,513,717 | 5/1996 | Louis et al. | 180/62 |
| 5,528,958 | 6/1996 | Hauser | 74/606 |
| 5,782,142 | 7/1998 | Abend et al. | 74/606 R X |
| 5,839,320 | 11/1998 | Komachi | 74/606 R X |

*Primary Examiner*—Allan D. Herrmann
*Attorney, Agent, or Firm*—Emerson & Associates; Roger D. Emerson; Timothy D. Bennett

[57]  ABSTRACT

A shaft alignment apparatus includes a first bearing block having a first opening for receiving a first associated shaft, a first housing member having a first slot for receiving the first bearing block, a second housing member and fastening means for fastening the first housing member to the second housing member. The first housing member has a junction surface lying on a junction plane and an internal base surface lying on a base plane. The first associated shaft is positioned between the base plane and junction plane of the first housing member. To align a first associated shaft, its first end is mounted into an opening in a first bearing block. The second end of the first associated shaft is then mounted into an opening in a second bearing block. Both the first and second bearing blocks are then slid simultaneously into first and second slots, respectively, in the first housing member. Finally, a second housing member is fastened to the first housing member.

19 Claims, 7 Drawing Sheets

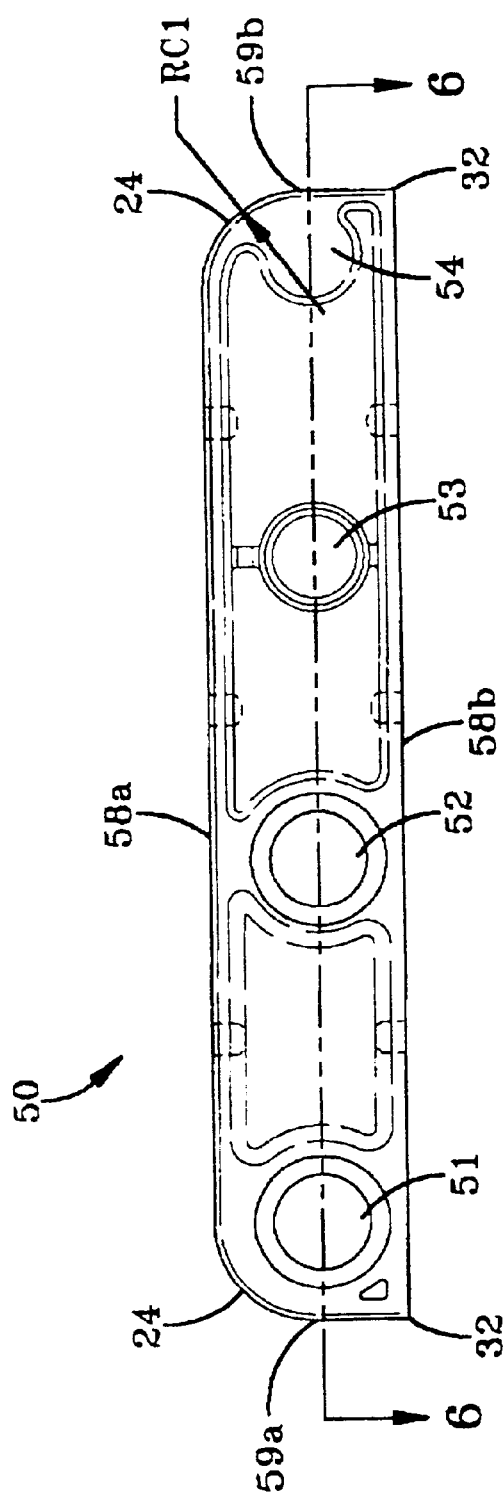
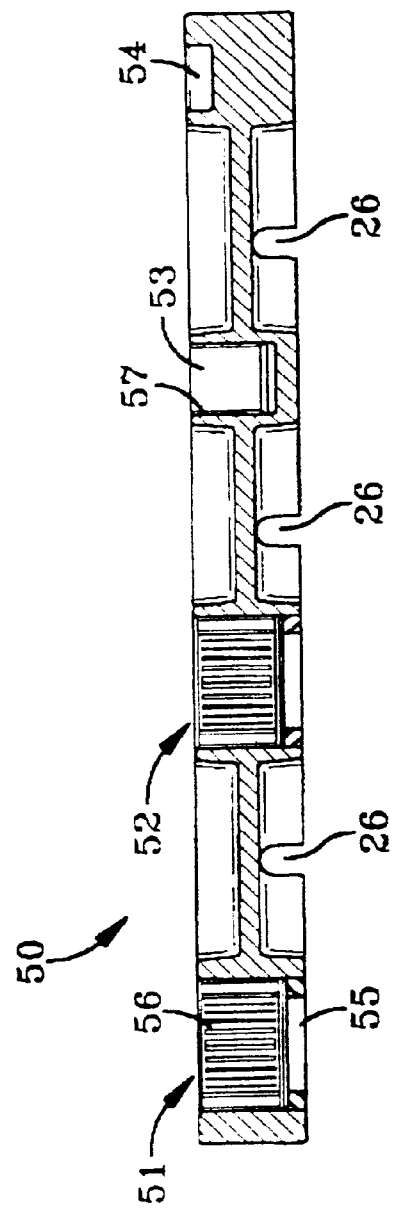
FIGURE-5
FIGURE-6

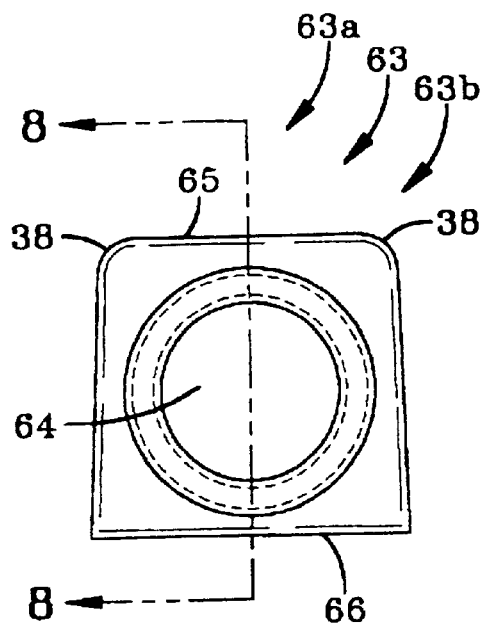
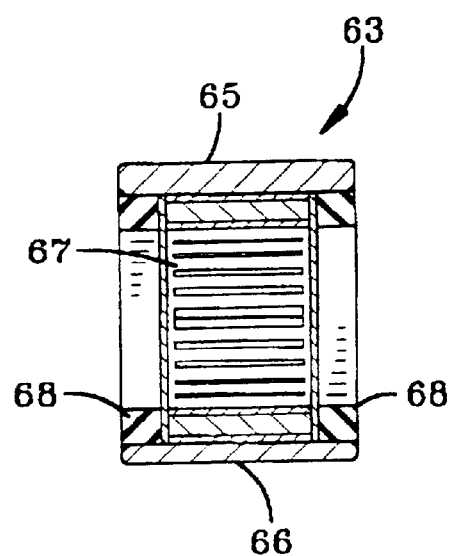
FIGURE-7  FIGURE-8
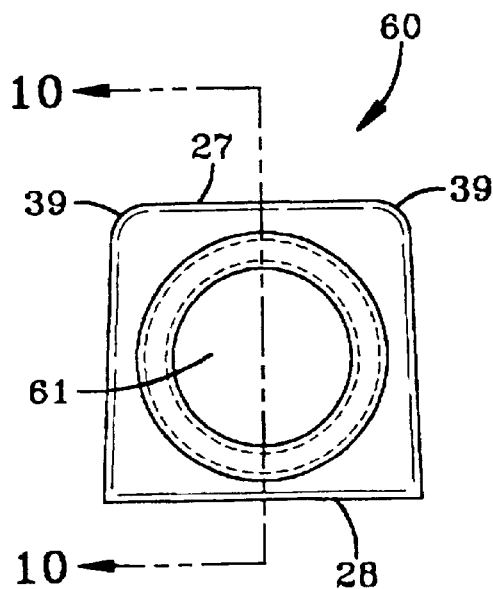
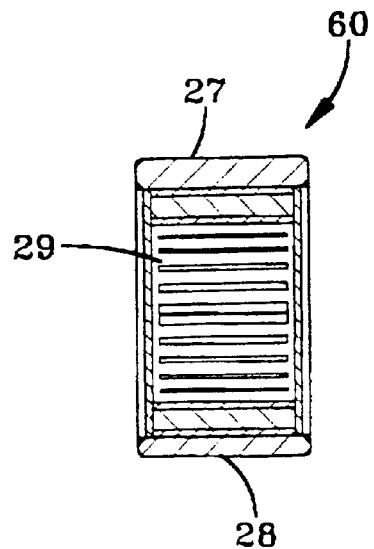
FIGURE-9  FIGURE-10

SHAFT ALIGNMENT APPARATUS AND METHOD

BACKGROUND OF THE INVENTION

1. Field of Invention

This invention pertains to the art of methods and apparatuses for aligning shafts, and more specifically to methods and apparatuses for aligning shafts within a transmission housing.

2. Description of the Related Art

It is well known to provide off-the-road vehicles, such as lawn and garden mowers, with a transmission for use in transmitting power from the engine to the drive axle and wheels. Such transmissions typically have various shafts, including the drive axle, that must be properly aligned with respect to other transmission components so that they may be effectively, operatively connected together. These components include gears, sprockets, clutches and other shafts.

A common problem often encountered in the art deals with the alignment of such shafts. In all known prior art cases, at least two transmission housing members are used in combination to align a shaft. U.S. Pat. No. 5,142,940, for example, discloses a side cover that has a bearing-retaining portion used to receive one end of a shaft. The side cover is secured to and works in combination with a wall of the transmission casing to align the shaft. U.S. Pat. No. 4,903, 546, which is commonly assigned, discloses a transmission housing constructed of two sections. The two sections combine to form shaft bearing journals for holding shafts. All such alignment means can be difficult to assemble and can be less accurate for shaft alignment purposes.

The present invention provides methods and apparatuses for aligning a shaft within one housing member. The difficulties inherent in the art are therefore overcome in a way that is simple and efficient, while providing better and more advantageous results.

SUMMARY OF THE INVENTION

According to one aspect of the present invention, there is provided a shaft alignment apparatus for aligning a first associated shaft. The shaft alignment apparatus includes a first bearing block having a first opening for receiving the first associated shaft, a first housing member having a first slot for receiving the first bearing block, a second housing member and fastening means for fastening the second housing member to the first housing member. The first housing member has a junction surface lying on a junction plane and an internal base surface lying on a base plane. The first associated shaft is positioned between the base plane and the junction plane of the first housing member.

According to another aspect of the present invention, the shaft alignment apparatus aligns first and second associated shafts each having first and second ends. The shaft alignment apparatus includes first and second bearing blocks each having first and second openings. The first openings are for receiving the first and second ends of the first associated shaft and the second openings are for receiving the first and second ends of the second associated shaft. The first housing member also has a second slot for receiving the second bearing block.

According to another aspect of the present invention, there is provided a method of aligning a first associated shaft having first and second ends. The first end of the first associated shaft is mounted into a first opening in a first bearing block. The second end of the first associated shaft is then mounted into a first opening in a second bearing block. Both the first and second bearing blocks are then slid simultaneously into first and second slots, respectively, in a first housing member. Finally, a second housing member is fastened to the first housing member.

One advantage of the present invention is that transmission assembly is simplified. Once all the required transmission components have been fitted onto the appropriate shaft, the shaft is mounted to a bearing block. Then the bearing block is simply slid into the appropriate slot in a housing member.

Another advantage of the present invention is that shaft alignment is automatic and more accurate. Only one housing member is required for proper alignment of the shaft. A second housing member is used like a lid.

Another advantage of this invention is that the housing members can be stamped rather than cast, reducing manufacturing costs.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 5 is a side view of the second bearing block showing the curved sections of the first edge and their radii of curvature.

FIG. 6 is a sectional view taken along the line 6—6 of FIG. 5 showing the grooves in the second bearing block which receive the fastening means.

FIG. 7 is a side view of the outer bearing block used for the first and second outer bearing blocks showing the first and second edges.

FIG. 8 is a sectional view taken along the line 8—8 of FIG. 7 showing the bearing and seals placed within the first opening of the outer bearing block.

FIG. 9 is a side view of the third bearing block showing the first and second edges.

FIG. 10 is a sectional view taken along the line 10—10 of FIG. 9 showing the bearing placed within the first opening of the third bearing block.

DESCRIPTION OF THE PREFERRED EMBODIMENT

Figure 1:
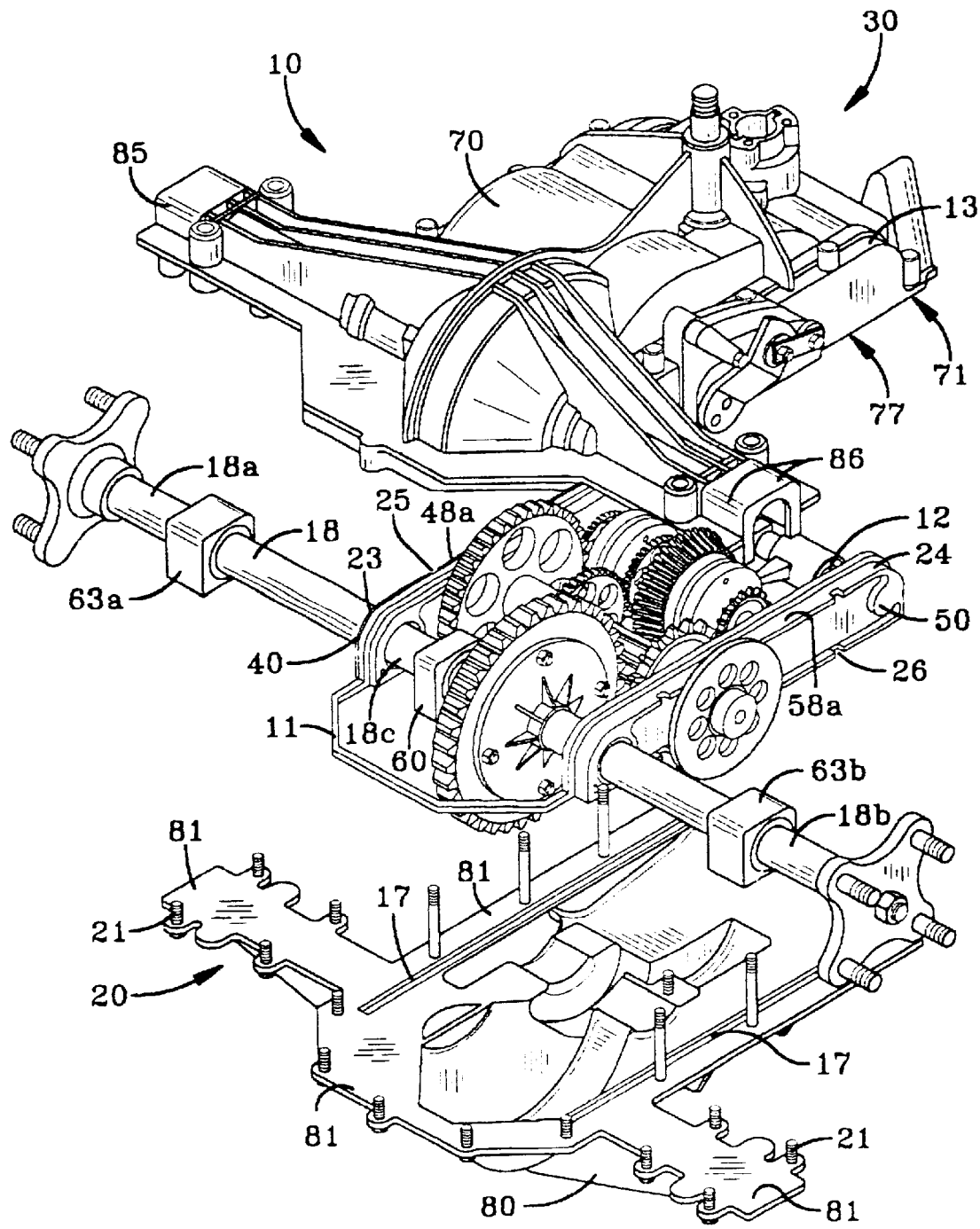
FIG. 1 is an exploded perspective assembly view of a transmission showing the shaft alignment apparatus of the present invention.
Figure 2:
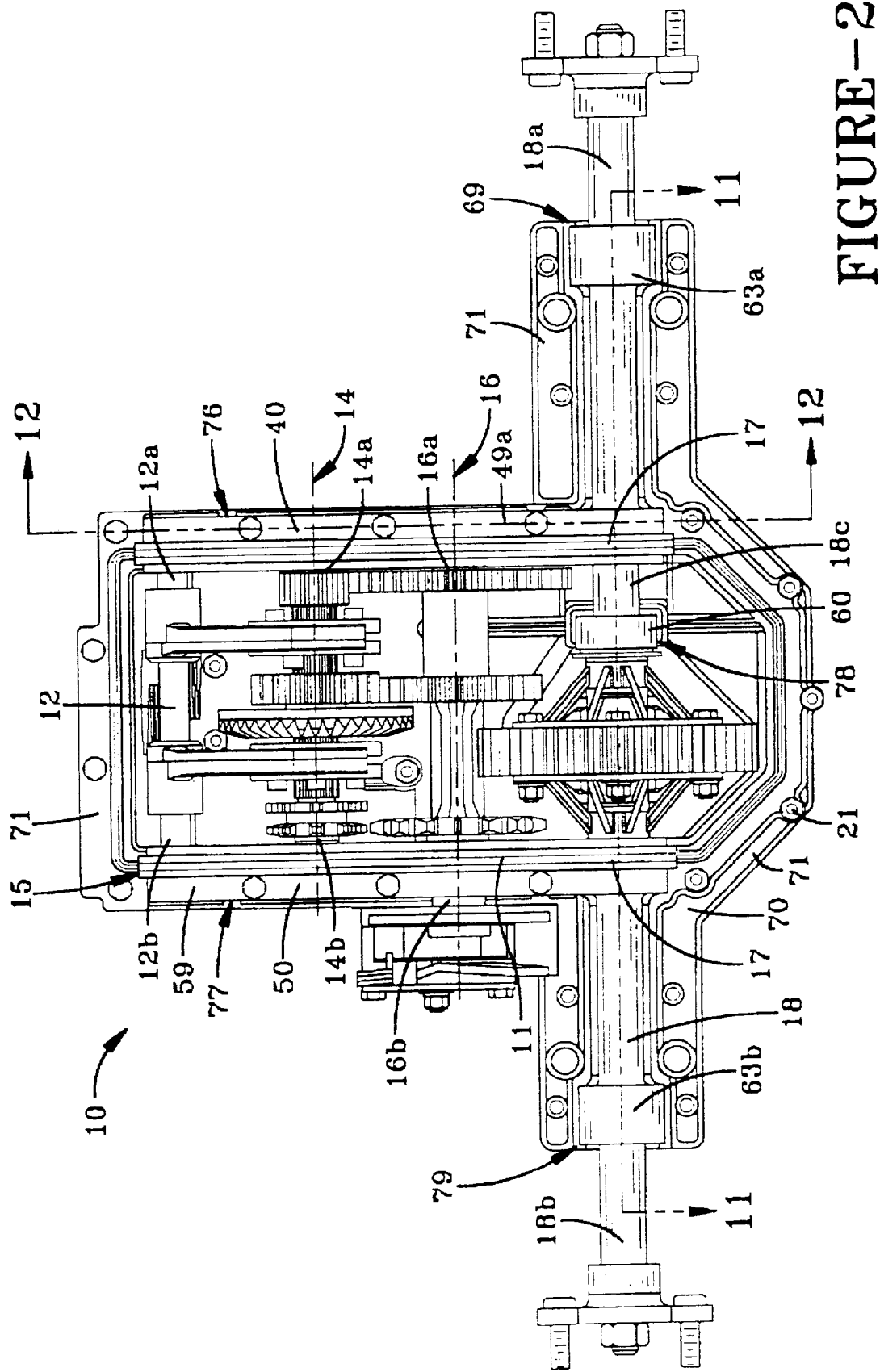
FIG. 2 is a bottom view of the transmission with the second housing member removed to show the various shafts in their aligned positions within the first housing member.
Figure 3:
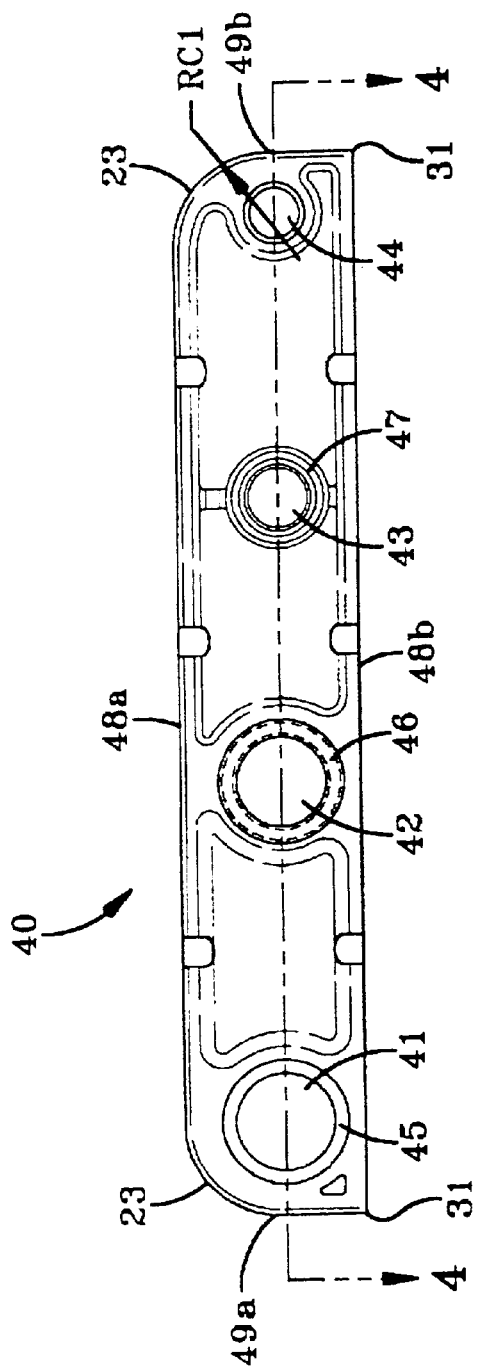
FIG. 3 is a side view of the first bearing block showing the curved sections of the first edge and their radii of curvature.
Figure 4:
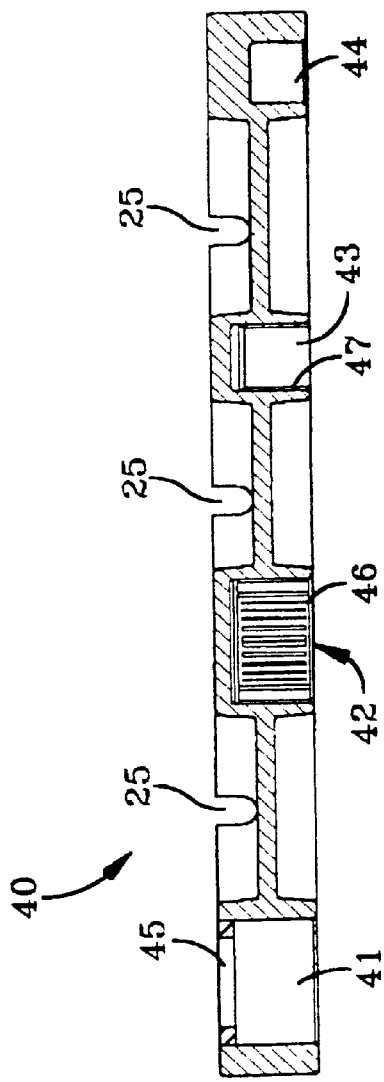
FIG. 4 is a sectional view taken along the line 4—4 of FIG. 3 showing the grooves in the first bearing block which receive the fastening means.

Referring now to the drawings wherein the showings are for purposes of illustrating a preferred embodiment of the invention only and not for purposes of limiting the same, FIG. 1 shows a transmission 10 which is equipped with the present invention, a shaft alignment apparatus 30. This embodiment includes a two-speed transmission used on a riding lawn mower but the invention is applicable to other transmissions, other gearing devices, and other applications as well. The transmission 10 includes many components such as gears, sprockets, shift forks, clutch collars, shafts and other items. In particular, as seen in FIG. 2, the transmission 10 has a shift shaft 12, a drive shaft 14, an output shaft 16, and a drive axle 18. The specific purposes of these components are not important to this invention so their operation will not be discussed further.

With reference now to FIGS. 1–2, the shaft alignment apparatus 30 of this preferred embodiment includes first and second bearing blocks 40, 50 which receive and align the shafts of this transmission 10. These shafts include the shift shaft 12 (having first and second ends 12a, 12b), the drive shaft 14 (having first and second ends 14a, 14b), the output shaft 16 (having first and second ends 16a, 16b), and the drive axle 18 (having first and second ends 18a, 18b and mid-section 18c). The drive axle 18 of the transmission 10 is much longer than the other shafts and requires additional support means. Preferably, the additional support means comprises a third bearing block 60 and first and second outer bearing blocks 63a, 63b. The shaft alignment apparatus 30 also includes first and second housing members 70, 80 which enclose the components of the transmission 10. The first and second housing members 70, 80 are fastened by fastening means 20 that is preferably bolts 21 although other fastening means chosen with sound engineering judgment could also be used.

With reference now to FIGS. 1–6, the first bearing block 40 has first, second, third and fourth openings 41, 42, 43, 44 for receiving the first ends 18a, 16a, 14a, 12a respectively. Similarly, the second bearing block 50 has first, second, third and fourth openings 51, 52, 53, 54 for receiving the second ends 18b, 16b, 14b, 12b respectively. It should be noted that a single bearing block with only one opening could be used in and is within the scope of this invention. When more than one shaft, such as drive axle 18 and output shaft 16, are used they are preferably aligned substantially parallel. The openings 41, 42, 43, 44, 51, 52, 53, 54 in the bearing blocks 40, 50 are further equipped to receive their respective shafts. Thus, in order to properly receive the drive axle 18, the first opening 41 of the first bearing block 40 has a seal 45 and the first opening 51 of the second bearing block 50 has both a seal 55 and a bearing 56. In order to properly receive the output shaft 16, second opening 42 of first bearing block 40 has a bearing 46 and the second opening 52 of the second bearing block 50 has both a seal 55 and a bearing 56. Third openings 43, 53 of first and second bearing blocks 40, 50 have bearing sleeves 47, 57 respectively. All these seals 45, 55, bearings 46, 56 and bearing sleeves 47, 57 are of types and sizes currently known in the art and chosen with sound engineering judgment.

With continuing reference to FIGS. 1–6, the first bearing block 40 has first and second edges 48a, 48b and first and second ends 49a, 49b. Similarly, the second bearing block 50 has first and second edges 58a, 58b and first and second ends 59a, 59b. The second edges, 48b, 58b comprise corners 31, 32 respectively. The first edges 48a, 58a do not have corners but rather have curved sections 23, 24 respectively. Thus, the first edges 48a, 58a do not have 90° right angle corners. The benefit of this "cornerless" design will be explained below. The curved sections 23, 24, which connect the first edges 48a, 58a to the first and second ends 49a, 49b, 58a, 59b respectively, have a radius of curvature RC1. Preferably, the radius of curvature RC1 for the curved sections 23, 24 is within the range of 0.2 inches to 10.0 inches. In this preferred embodiment, the radius of curvature RC1 is 1.0 inch. The first and second bearing blocks 40, 50 preferably have grooves 25, 26 for receiving the fastening means 20.

With reference now to FIGS. 1–2 and 7–10, the first and second outer bearing blocks 63a, 63b are identical and indicated as bearing block 63 in FIGS. 7–8. The first and second bearing blocks 63a, 63b each have a first opening 64 for receiving a shaft, a first edge 65 that is cornerless comprising curved sections 38 and a second edges 66. In this preferred embodiment, the first and second bearing blocks 63a, 63b each have a bearing 67 and a pair of seals 68 on either side of the bearing 67. Similarly, third bearing block 60 has a first opening 61, a first edge 27 that is conerless comprising curved sections 39, a second edge 28 and a bearing 29. The bearings 67, 29 and seals 68 are of types and sizes currently known in the art and chosen with sound engineering judgment. To assist in supporting and aligning the drive axle 18, the third bearing block 60 is preferably mounted to the mid-section 18c between the first and second bearing blocks 40, 50. The first and second outer bearing blocks 63a, 63b are preferably mounted to the first and second ends 18a, 18b of the drive axle 18 which extends through the first and second bearing blocks 40, 50.

Figure 11:
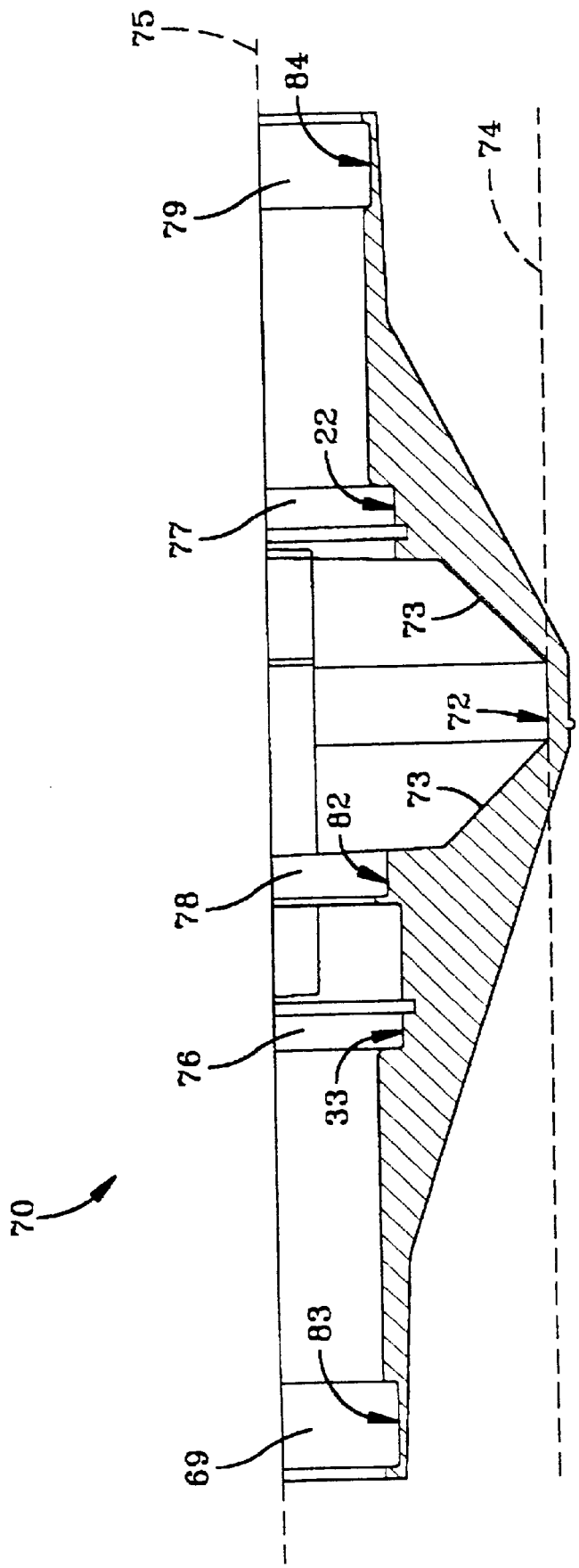
FIG. 11 is a sectional view taken along the line 11—11 of FIG. 2 showing the base plane and the junction plane of the first housing member.
Figure 12:
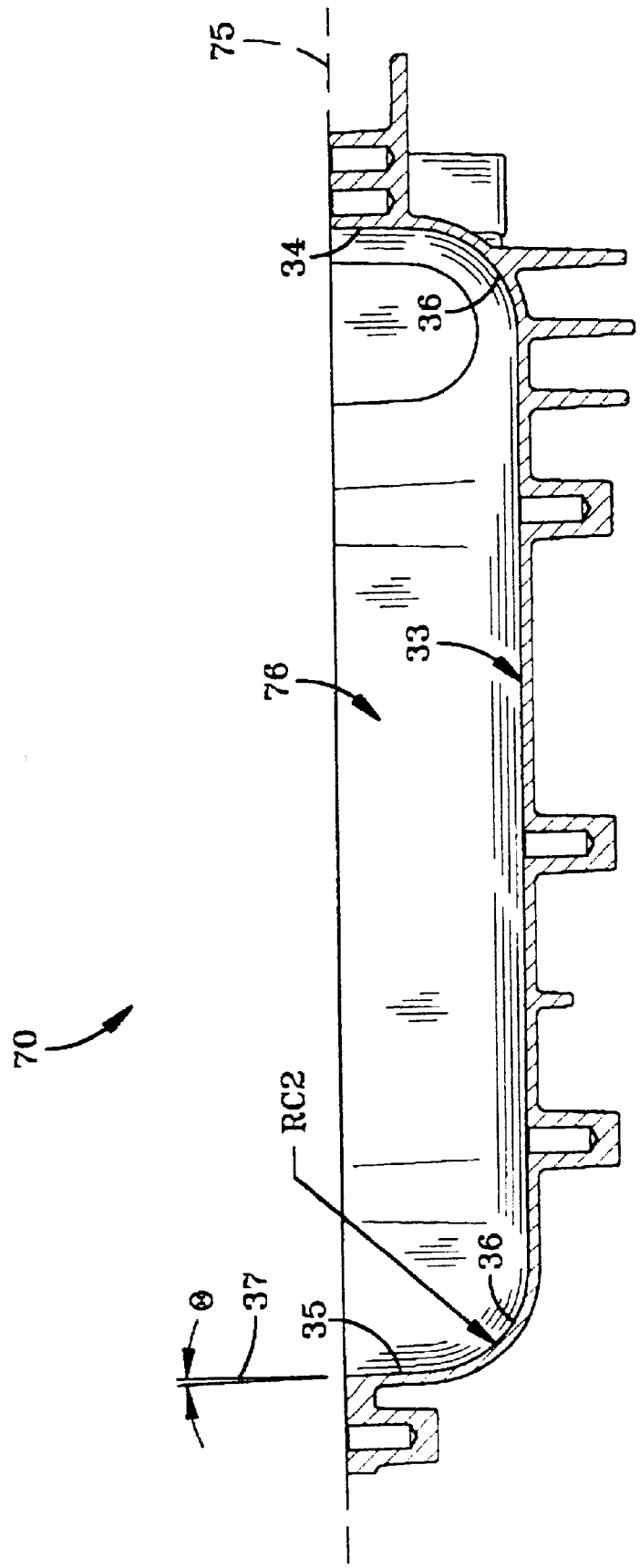
FIG. 12 is a sectional view taken along the line 12—12 of FIG. 2 showing the radius of curvature of the curved sections of the first slot as well as the angled position of the second end of the first slot.

With reference now to FIGS. 1–2 and 11–12, the first housing member 70 has a junction surface 71 where the first housing member 70 joins the second housing member 80 in sealing engagement when the fastening means 20 is fastened. The junction surface 71, as best seen in FIG. 2, extends around the perimeter of the first housing member 70 and lies on a plane indicated as junction plane 75. The junction plane 75 is illustrated in FIGS. 11–12. The first housing member 70 also has an internal base surface 72 which is the surface on the inner surface 73 of the first housing member 70 farthest from the junction plane 75. The internal base surface 72 lies on a plane indicated as base plane 74, illustrated in FIG. 11, that is parallel to the junction plane 75.

With continuing reference to FIGS. 1–2 and 11–12, the first housing member 70 has, as best seen in FIGS. 2 and 11, first, second and third slots 76, 77, 78 for receiving the first, second and third bearing blocks 40, 50, 60. Preferably a gasket 11 is also used for sealing purposes as is known in the art. The first housing member 70 also has first and second outer slots 69, 79 for receiving the first and second outer bearing blocks 63a, 63b. The first slot 76, as seen best in FIG. 12, has a receiving surface 33 and first and second ends 34, 35. The receiving surface 33 has no corners but it includes curved sections 36, which connect the receiving surface 33 to the first and second ends 34, 35, and receive the curved sections 23 of the first edge 48a of the first bearing block 40. The cornerless receiving surface 33 is very beneficial during assembly as it greatly reduces the liklihood of the first bearing block 40 binding as it is slid into the first slot 76. The curved sections 36 have a radius of curvature RC2 that is substantially the same as the radius of curvature RC1. Thus, the radius of curvature RC2 is within the range of 0.2 inches to 10.0 inches. In the preferred embodiment, the radius of curvature RC2 is 1.0 inch.

With reference now to FIG. 12, the second end 35 of the first slot 76 is preferably positioned at an angle θ with respect to a line, such as line 37, that is perpendicular to the junction plane 75. This angled design helps in reducing binding as the first bearing block 40 is slid into the first slot 76. The angle θ is preferably within the range of 0° to 45°. In this preferred embodiment, angle θ is 2°.

Referring now to FIGS. 1–2, 5 and 11, the second slot 77 of the first housing 70 member 70 is designed similar to the first slot 76. In particular, it also has a receiving surface 22 (shown in FIG. 11) with curved sections 13 (shown in FIG. 1) that receive the curved sections 24 of the first edge 58a of the second bearing block 50 (shown in FIG. 5). The curved sections 13 of the second slot 77 also have the radius of curvature RC2 discussed above. The second slot 77 also has a second end 15 (shown in FIG. 2) positioned at the angle θ discussed above. Preferably, the first and second slots 76, 77 are substantially parallel.

With reference to FIGS. 1–2, 7 and 11, the first and second outer slots 69, 79 have receiving surfaces 83, 84 (shown in FIG. 11) respectively including curved sections 85, 86 (shown in FIG. 1) for receiving the curved sections 38 of the first and second outer bearing blocks 63a, 63b (shown in FIG. 7). Similarly, the third slot 78 has a receiving surface 82 with curved sections (not shown) for receiving the curved sections 39 of the third bearing block 60.

With reference to FIGS. 1–2 and 5–10, the second housing member 80 has a junction surface 81 where the second housing member 80 joins the junction surface 71 of the first housing member 70 in sealing engagement when the fastening means 20 is fastened. Preferably, a gasket 17 is also used for sealing purposes as is known in the art. The junction surface 81 extends around the perimeter of the second housing member 80. It should be noted that the second housing member 80 does not have any slots for receiving any of the bearing blocks. Rather, the second edges 48b, 58b, 66, 28 of the first, second, outer (first and second outer) and third bearing blocks 40, 50, 63, 60 rest against the junction surface 81 when the fastening means 20 has been fastened.

With reference now to FIGS. 1–12, the shaft alignment apparatus 30 permits the automatic alignment of shafts using only that same housing member for alignment purposes. In particular, when the transmission 10 is assembled, all the shafts i.e., the shift shaft 12, the drive shaft 14, the output shaft 16 and the drive axle 18, are positioned in alignment within the first housing member 70 between the junction plane 75 and the base plane 74. This automatic alignment ensures that the shafts wear less and are quieter in operation. The second edges 48b, 58b, 66, 28 of the first, second, outer (first and second outer) and third bearing blocks 40, 50, 63, 60 are also positioned within the first housing member 70 between the junction plane 75 and the base plane 74. The first edges 49b, 59b, 65, 27 of the first, second, outer (first and second outer) and third bearing blocks 40, 50, 63, 60 are located just outside the junction plane 75. When the fastening means 20 is fastened, the bearing blocks are pushed inside the first housing member 70 until the first edges 49b, 59b, 65, 27 lie on the junction plane 75 as well as on the junction surface 81. In this way the second housing member 80 acts like a lid for the transmission 10.

With reference to FIGS. 1–2 and 11, the shaft alignment apparatus 30 of this invention permits the first and second housing members 70, 80 to be stamped rather than cast, thereby reducing manufacturing costs. This is possible because the first and second bearing blocks 40, 50 are precisely machined to hold any and all shafts contained within the bearing blocks in proper alignment. Another important benefit of this design is that it also permits the use of a single housing design for transmissions having different combinations of components. Thus, for example, the first and second housing members 70, 80 that are herein used with a two-speed transmission could be used with other types of transmissions. It is only required that the corresponding bearing blocks (not shown) properly fit within the first and second slots 76, 77 of the first housing member 70.

With reference to FIGS. 1–12, a first shaft such as drive axle 18, and a second shaft such as output shaft 16, can be aligned as follows. The first end 18a of the drive axle 18 is mounted into the first opening 41 of the first bearing block 40. Any transmission components (not shown) that are required are then attached to the drive axle 18. The first end 16a of the output shaft 16 is mounted into the second opening 42 of the first bearing block 40 and any transmission components (now shown) that are required are attached. Next, the second end 18b of the drive axle 18 is mounted into the first opening 51 of the second bearing block 50 and the second end 16b of the output shaft 16 is mounted into the second opening 52 of the second bearing block 50. The first and second bearing blocks 40, 50 are then slid, preferably simultaneously, into the first and second slots 76, 77 of the first housing member 70. Finally, the second housing member 80 is fastened to the first housing member 70 using fastening means 20.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A shaft alignment apparatus for aligning a first associated shaft, the shaft alignment apparatus comprising:

a first bearing block having a first opening for receiving the first associated shaft and a first groove;

a first housing member having a junction surface, an internal base surface and a first slot, said junction surface lying on a junction plane, said internal base surface lying on a base plane wherein said junction plane is substantially parallel to said base plane, said first slot selectively receiving said first bearing block, the first associated shaft being positioned between said junction plane and said base plane;

a second housing member having a junction surface, said first and second housing members enclosing said first bearing block and the first associated shaft; and, fastening means for fastening said junction surface of said first housing member to said junction surface of said second housing member, said first groove receiving said fastening means.

2. The shaft alignment apparatus of claim 1 wherein said first bearing block comprises:

a first edge, said first edge being cornerless, said first slot of said first housing member having a receiving surface for receiving said first edge, said receiving surface being cornerless.

3. The shaft alignment apparatus of claim 2 wherein said first edge of said first bearing block comprises:

a curved section, said receiving surface of said first slot having a curved section, said curved section of said first slot receiving said curved section of said first bearing block.

4. The shaft alignment apparatus of claim 3 wherein said curved section of said first bearing block has a radius of curvature RC1, said curved section of said first slot having a radius of curvature RC2, said radii of curvature RC1, RC2 being within the range of 0.2 inches to 10.0 inches.

5. The shaft alignment apparatus of claim 4 wherein said radius of curvature RC1 is substantially the same as radius of curvature RC2, said radii of curvature RC1, RC2 being substantially 1.0 inches.

6. The shaft alignment apparatus of claim 1 wherein said first slot comprises:
   a first end, said first end being positioned at an angle 0 with respect to a line that is perpendicular to said junction plane, said angle 0 being within the range of 0° to 45°.

7. The shaft alignment apparatus of claim 1 wherein said first associated shaft has first and second ends, said first housing member also having a second slot, the shaft alignment apparatus further comprising:
   a second bearing block having a first opening, said first opening of said first hearing block receiving the first end of the first associated shaft, said first opening of said second bearing block receiving the second end of the first associated shaft, said second slot of said first housing member receiving said second bearing block, said second bearing block also having a second groove for receiving said fastening means.

8. The shaft alignment apparatus of claim 7 wherein said first and second bearing blocks comprise:
   first and second edges, said first edges being positioned between said junction plane and said base plane, said second edges being positioned on said junction plane when said fastening means is fastened.

9. The shaft alignment apparatus of claim 7 wherein said first and second slots are substantially parallel.

10. A shaft alignment apparatus for aligning first and second associated shafts each having first and second ends, the shaft alignment apparatus comprising:
   a first bearing block having a first opening for receiving the first end of the first associated shaft and a second opening for receiving the first end of the second associated shaft;
   a second bearing block having a first opening for receiving the second end of the first associated shaft and a second opening for receiving the second end of the second associated shaft;
   a first housing member having a junction surface, an internal base surface, and first and second slots, said junction surface lying on a junction plane, said internal base surface lying on a base plane wherein said junction plane is substantially parallel to said base plane, said first slot selectively receiving said first hearing block, said second slot selectively receiving said second bearing block, the first and second associated shafts being positioned between said junction plane and said base plane;
   a second housing member having a junction surface, said first and second housing members enclosing said first and second bearing blocks and the first and second associated shafts; and,
   fastening means for fastening said junction surface of said first housing member to said junction surface of said second housing member.

11. The shaft alignment apparatus of claim 10 wherein the first and second associated shafts are aligned substantially parallel.

12. A shaft alignment apparatus for aligning a first associated shaft having first and second ends, the shaft alignment apparatus comprising:
   a first bearing block having a first opening for receiving the first end of the first associated shaft;
   a second bearing block having a first opening for receiving the second end of the first associated shaft;
   a third bearing block having a first opening for receiving the first associated shaft, said third bearing block being positioned between said first and second bearing blocks;
   a first housing member having a junction surface, an internal base surface and first, second and third slots, said junction surface lying on a junction plane, said internal base surface lying on a base plane wherein said junction plane is substantially parallel to said base plane, said first, second and third slots selectively receiving said first, second and third bearing blocks respectively, the first associated shaft being positioned between said junction plane and said base plane;
   a second housing member having a junction surface, said first and second housing members enclosing said first, second and third bearing blocks and the first associated shafts; and,
   fastening means for fastening said junction surface of said first housing member to said junction surface of said second housing member.

13. A shaft alignment apparatus for aligning, a first associated shaft having first and second ends, the shaft alignment apparatus comprising:
   a first bearing block having a first opening for receiving the first end of the first associated shaft, the first end of the first associated shaft extending through said first bearing block;
   a second bearing block having a first opening for receiving the second end of the first associated shaft;
   a first outer bearing block having a first opening for receiving the first end of the first associated shaft;
   a first housing member having a junction surface, an internal base surface, first and second slots and a first outer slot, said junction surface lying on a junction plane, said internal base surface lying on a base plane wherein said junction plane is substantially parallel to said base plane, said first and second slots selectively receiving said first and second bearing blocks respectively, said first outer slot selectively receiving said first outer bearing block, the first associated shaft being positioned between said junction plane and said base plane;
   a second housing member having a junction surface, said first and second housing members enclosing said first and second bearing blocks, said first outer bearing block, and the first associated shaft; and,
   fastening means for fastening said junction surface of said first housing member to said junction surface of said second housing member.

14. A shaft alignment apparatus for aligning first and second associated shafts each having first and second ends, the shaft alignment apparatus comprising:
   a first bearing block, said first bearing block having first and second openings for receiving the first ends of the first and second associated shafts, said first bearing block comprising a first edge having a curved section with a radius of curvature RC1, said first bearing block having a first groove;

a second bearing block, said second bearing block having first and second openings for receiving the second ends of the first and second associated shafts, said second bearing block comprising a first edge having a curved section with a radius of curvature RC1, said second bearing block having a first groove;

a first housing member, said first housing member having a junction surface, an internal base surface and first and second slots, said junction surface lying on a junction plane, said internal base surface lying on a base plane wherein said junction plane is substantially parallel to said base plane, said first and second slots each comprising receiving surfaces having curved sections with a radius of curvature RC2, said curved sections of said first and second slots receiving said curved sections of said first and second bearing blocks, said radii of curvature RC1 and RC2 being substantially 1.0 inches, the first and second associated shafts being positioned between said junction plane and said base plane;

a second housing member having a junction surface, said first and second housing members enclosing said first and second bearing blocks and the first and second associated shafts; and, fastening means for fastening said junction surface of said first housing member to said junction surface of said second housing member, said first grooves of said first and second bearing blocks receiving said fastening means.

15. A method of aligning first and second associated shafts each having first and second ends, the method comprising the steps of:

mounting the first end of the first associated shaft into a first opening of a first hearing block;

mounting the first end of the second associated shaft into a second opening of Said first bearing block;

mounting the second end of the first associated shaft into a first opening of a second bearing block;

mounting the second end of the second associated shaft into a second opening of said second bearing block;

sliding simultaneously said first bearing block into a first slot of a first housing member and said second bearing block into a second slot of said first housing member; and, fastening a second housing member to said first housing member.

16. The method of claim 15 wherein said first housing member has a junction surface lying on a junction plane and an internal base surface lying on a base plane, the method after the step of sliding simultaneously said first bearing block into a first slot of a first housing member and said second bearing block into a second slot of said first housing member having the step of:

positioning the first and second associated shafts between said junction plane and said base plane of said first housing member.

17. The method of claim 16 wherein said first and second bearing blocks have first and second edges, the method before the step of fastening a second housing member to said first housing member having the step of:

pushing said first and second bearing blocks, said first edges being positioned between said junction plane and said base plane, said second edges lying on said junction plane.

18. A method of aligning a first associated shaft having first and second ends and a mid-section, the method comprising the steps of:

mounting the mid-section of the first associated shaft into a first opening of a third bearing block;

mounting the first end of the first associated shaft into a first opening of a first bearing block;

mounting the second end of the first associated shaft into a first opening of a second bearing block;

sliding simultaneously, said first bearing block into a first slot of said first housing member, said second bearing block into a second slot of said first housing member and said third hearing block into a third slot of a housing member; and, fastening a second housing member to said first housing member.

19. A method of aligning a first associated shaft having first and second ends, the method comprising the steps of:

mounting the first end of the first associated shaft into a first opening of a first bearing block such that the first end extends out through said first opening;

mounting the first end of the first associated shaft into a first opening of a first outer bearing block;

mounting the second end of the first associated shaft into a first opening of a second bearing block;

sliding simultaneously said first bearing block into a first slot of a first housing member, said first outer bearing block into a first outer slot of said first housing member and said second bearing block into a second slot of said first housing member; and, fastening a second housing member to said first housing member.

* * * * *